United States Patent
Gallarda et al.

(10) Patent No.: US 6,374,634 B2
(45) Date of Patent: Apr. 23, 2002

(54) COLUMN FOR THE CRYOGENIC SEPARATION OF GASEOUS MIXTURES AND METHOD FOR THE CRYOGENIC SEPARATION OF A MIXTURE CONTAINING HYDROGEN AND CO USING THIS COLUMN

(75) Inventors: Jean Gallarda, Joinville le Pont; François Cam, Drancy, both of (FR)

(73) Assignee: L'Air Liquide, Societe Anonyme pour l'Etude et l'Exploitation des Procedes Georges Claude, Paris (FR)

( * ) Notice: Subject to any disclaimer, the term of this patent is extended or adjusted under 35 U.S.C. 154(b) by 0 days.

(21) Appl. No.: 09/828,354

(22) Filed: Apr. 9, 2001

(30) Foreign Application Priority Data

Apr. 7, 2000 (FR) .................................. 00 04486

(51) Int. Cl.$^7$ ................................ F25J 3/02
(52) U.S. Cl. ...................................... 62/620
(58) Field of Search ........................ 62/620, 623, 901, 62/905, 920, 932

(56) References Cited

U.S. PATENT DOCUMENTS

| 1,604,240 | A | * | 10/1926 | Schlitt et al. | |
|---|---|---|---|---|---|
| 3,124,443 | A | * | 3/1964 | Hellingman et al. | ............ 62/42 |
| 5,509,271 | A | * | 4/1996 | Billy et al. | ..................... 62/620 |
| 6,023,945 | A | * | 2/2000 | Wong et al. | ................... 62/643 |
| 6,070,430 | A | * | 6/2000 | McNeil et al. | ................. 62/620 |
| 6,250,106 | B1 | * | 6/2000 | Agrawal | ....................... 62/643 |

FOREIGN PATENT DOCUMENTS

EP                0 598 382          5/1994

* cited by examiner

Primary Examiner—William Doerrler
Assistant Examiner—Malik N. Drake
(74) Attorney, Agent, or Firm—Young & Thompson

(57) ABSTRACT

Column for the cryogenic separation of gaseous mixtures comprising:

Figure 1:
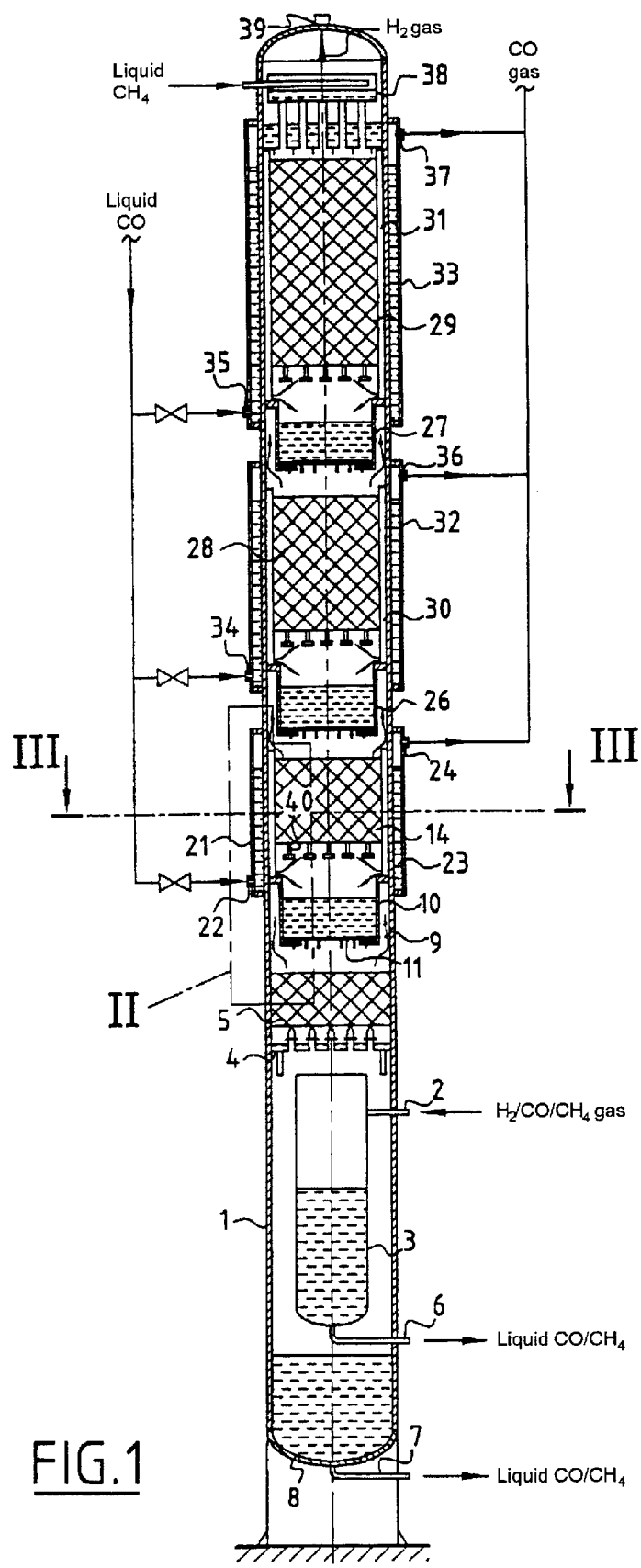

liquid traps (10, 26, 27) located between two active zones (5, 14, 28, 29) consisting of a cylindrical container with a perforated bottom (11) and defining, with the column, an annular space (9) through which the ascending gases pass;

internal linings (30, 31) of the column, means (15) for causing the ascending gases to pass into the said internal linings (30, 31) and means (18) for causing the said gases and the liquid they contain to leave the said linings (30, 31), returning them to the interior of the column above the said liquid trap (10, 26, 27);

external jackets (21, 32, 33) of the column, comprising means (22, 34, 35) of introducing a cooling fluid (23) into their lower part and means (24, 36, 37) of extracting the said fluid from their upper part, the said external jacket (21, 32, 33) allowing heat transfers between the said fluid (23) and the matter circulating in the internal lining (30, 31);

and means (38) for introducing a liquefied gas to scrub the gas extracted at the top of the column.

10 Claims, 3 Drawing Sheets

COLUMN FOR THE CRYOGENIC SEPARATION OF GASEOUS MIXTURES AND METHOD FOR THE CRYOGENIC SEPARATION OF A MIXTURE CONTAINING HYDROGEN AND CO USING THIS COLUMN

The invention relates to columns for the cryogenic separation of gaseous mixtures. More precisely, it relates in particular to columns in which hydrogen can be separated from the CO and from the methane contained in a synthesized gas, by scrubbing the hydrogen with liquid methane to purify it.

It will be noted in what follows that all the pressures mentioned are absolute pressures.

One of the main methods of producing hydrogen on an industrial scale consists in using water vapour to reform a light hydrocarbon such as methane. This yields a hydrogen/CO mixture containing residual methane, which can then be treated in various ways to extract hydrogen in the pure state from it.

In one of these methods, the synthesized gas containing about 70% hydrogen, 25% CO and 5% methane is introduced into a column for the cryogenic separation under high pressure (of the order of 15 to 45 bar) by scrubbing with methane. The synthetic gas is then at a temperature of −180° C. The CO and the methane, containing a little dissolved hydrogen, are carried to the bottom of the column in the liquid state and are extracted therefrom, while the hydrogen is extracted from the top of the column in the gaseous state. The CO/methane/dissolved hydrogen mixture is introduced into a second column where it undergoes stripping at medium pressure (of the order of 10 bar). The hydrogen is collected in the gaseous state at the top of the column, and the CO/methane liquid mixture is collected at the bottom of the column. This mixture is then introduced into a column at low pressure (of the order of 2.5 bar). The gaseous CO is collected at the top of the column and the liquid methane is collected at the bottom of the column.

The liquid methane collected from the third column is pumped and introduced in the liquid state into the top of the first column so as to scrub the hydrogen with methane in order to purify this hydrogen. The lower the temperature at which this operation is carried out, the more effective it is. In this particular case, the desire is to keep the temperature in the entirety of the first column as close as possible to −180° C., this limit being imposed by the temperature at which methane solidifies, which is −182.5° C. For this purpose, as the scrubbing is exothermal, heat has to be extracted from the circulating matter at various points in the column. To do this, it is sensible to use liquid CO produced in a refrigeration cycle.

Certain devices currently in use for this purpose operate on the following principle. The synthetic hydrogen/CO/methane gas is introduced at a given level into the lower part of the column at a temperature of −180° C. It passes, as it rises up inside the column, through an active zone of the column, such as a first packing, where it becomes impoverished in CO and heats up to −175.4° C. The gaseous mixture is extracted for a first time from the column above this first packing; it is introduced into a first passage of a plate-type heat exchanger where its temperature is brought back down to −180.9° C. and is reintroduced into the column above its first point of extraction. It continues to ascend in the column, passing through a second packing where it becomes impoverished in CO and heats up to −176.1° C. The gaseous mixture is once again extracted from the column above this second packing and sent to a second passage of the plate-type heat exchanger where it is cooled to −180.9° C. then reintroduced into the column above its second point of extraction. As it continues to ascend, it passes through a third packing, after which it is extracted once again from the column to be cooled in a third passage of the plate-type heat exchanger and is reintroduced at −180.9° C. into the column above its third point of extraction. As it continues to ascend, the gas passes through a fourth and last packing, above which the scrubbing liquid methane is introduced. As has been stated, the scrubbing of the hydrogen with liquid methane, which causes CO to condense and mix in with the liquid methane causes an increase in the temperature of the ascending gases, entailing extracting them to cool them after each passage through an active zone such as a packing. It is the hydrogen purified of its CO under high pressure which is collected at the top of the column.

Liquid traps with perforated bottoms, placed between the various packings are there to collect the descending liquid leaving a packing and to distribute it over the upper surface of the packing immediately below it. They also make it possible to compensate for the pressure drops in the aforementioned cooling circuits.

The number of packings, the number of levels at which the gases are extracted from the column and to which they are returned after cooling, and the number of passages in the heat exchanger are given by way of indication. The numbers may be higher or lower than those which have been described.

The plate-type exchanger optimally works on the CO collected at the top of the third column, which is in the liquid state at a temperature of −182° C. and is vaporized at 2.6 bar under the effect of heat transfers which take place between it and the gases extracted from the first column. The exchanger is supplied with liquid CO by a thermosiphon into which the liquid CO from the third column is introduced and to which the gaseous CO is returned after it has passed through the heat exchanger before being extracted therefrom.

This first column and the heat exchanger and the thermosiphon which are appended to it, constitute a bulky assembly. In particular, the pipework conveying the synthetic gases from the column to the heat exchanger and from the exchanger to the column constitute a complex circuit that it would be desirable to eliminate.

The object of the invention is to propose a column for cryogenic separation, that can be used in a method for producing hydrogen from a mixture containing hydrogen and CO using scrubbing of the gases with liquid methane, which is notably less bulky and less complex than the columns and their auxiliaries customarily used for implementing this method.

To this end, the subject of the invention is a column for the cryogenic separation of gaseous mixtures, characterized in that it comprises:
  a cylindrical wall;
  means of introducing the gaseous mixture into the said column;
  at least one assembly consisting of:
    two active zones spaced staggered along the height of the column and filling the entire cross section thereof;
    a liquid trap located between the said active zones, consisting of a cylindrical container with a perforated bottom and the outer side wall of which defines, with the cylindrical wall of the column, an annular space in which the gases circulating upwards inside the column can pass after they have passed through the active zone above which the said liquid trap is positioned;

an internal lining of the cylindrical wall of the column, having its lower end located level with the upper edge of a liquid trap, means for causing the gases leaving the active zone located below the said liquid trap to pass into the said internal lining, and means for causing the said gases and the condensed liquid they contain to leave the said internal lining, returning them to the interior of the column above the said liquid trap;

an external jacket of the cylindrical wall of the column, located facing the said internal lining, comprising means of introducing a cooling fluid into its lower part and means of extracting the said fluid at its upper part, the said external jacket allowing heat transfers between the said cooling fluid and the gaseous and liquid matter circulating in the internal lining via the cylindrical wall of the column;

means for introducing a liquefied gas into the upper part of the column to scrub the gas extracted at the top of the column;

means of extracting the most volatile gas from the said gaseous mixture at the top of the said column, and means of extracting, in the liquid state, the least volatile gas or gases of the said gaseous mixture at the bottom of the said column.

According to a preferred embodiment, the said internal linings comprise, distributed alternately about the internal circumference of the column, first portions which open at their lower part through orifices into the said annular space and through which the gases circulating upwards inside the column can pass, and second portions opening, in their lower part, through orifices above the upper edge of the said liquid trap so as to convey the circulating gases and the liquid which is condensed in the said second portions into the column, the said first and second portions being placed in communication in the upper end of the said internal lining.

The said portions of the internal linings are preferably lined with heat exchange fins of the "straight fin" type, in the case of the first portions, and of the "serrated fin" type in the case of the second portions.

Another subject of the invention is a method for the cryogenic separation of a mixture containing hydrogen and CO, of the type comprising a stage of scrubbing the hydrogen present at the top of the column with a liquefied gas before it is extracted, characterized in that:

it is performed using a column into which the said mixture is introduced;

the cooling fluid introduced into the external jackets of the wall of the column is liquid CO; and the liquefied scrubbing gas introduced into the upper part of the column is a hydrocarbon.

As will have been appreciated, the invention consists in cooling the ascending gaseous mixture not now outside the column in a separate exchanger, but inside the column itself. This is achieved by means of a series of jackets external to the wall of the column, through which the cooling fluid, such as liquid CO, needed for cooling the gases is circulated. Liquid traps of a suitable configuration and internal linings of the wall of the column direct the ascending gases along the wall of the column, facing the zones at which the external jackets are located, so as to achieve the desired heat exchange. The internal linings also reintroduce cooled matter into the central part of the column.

Figure 2:
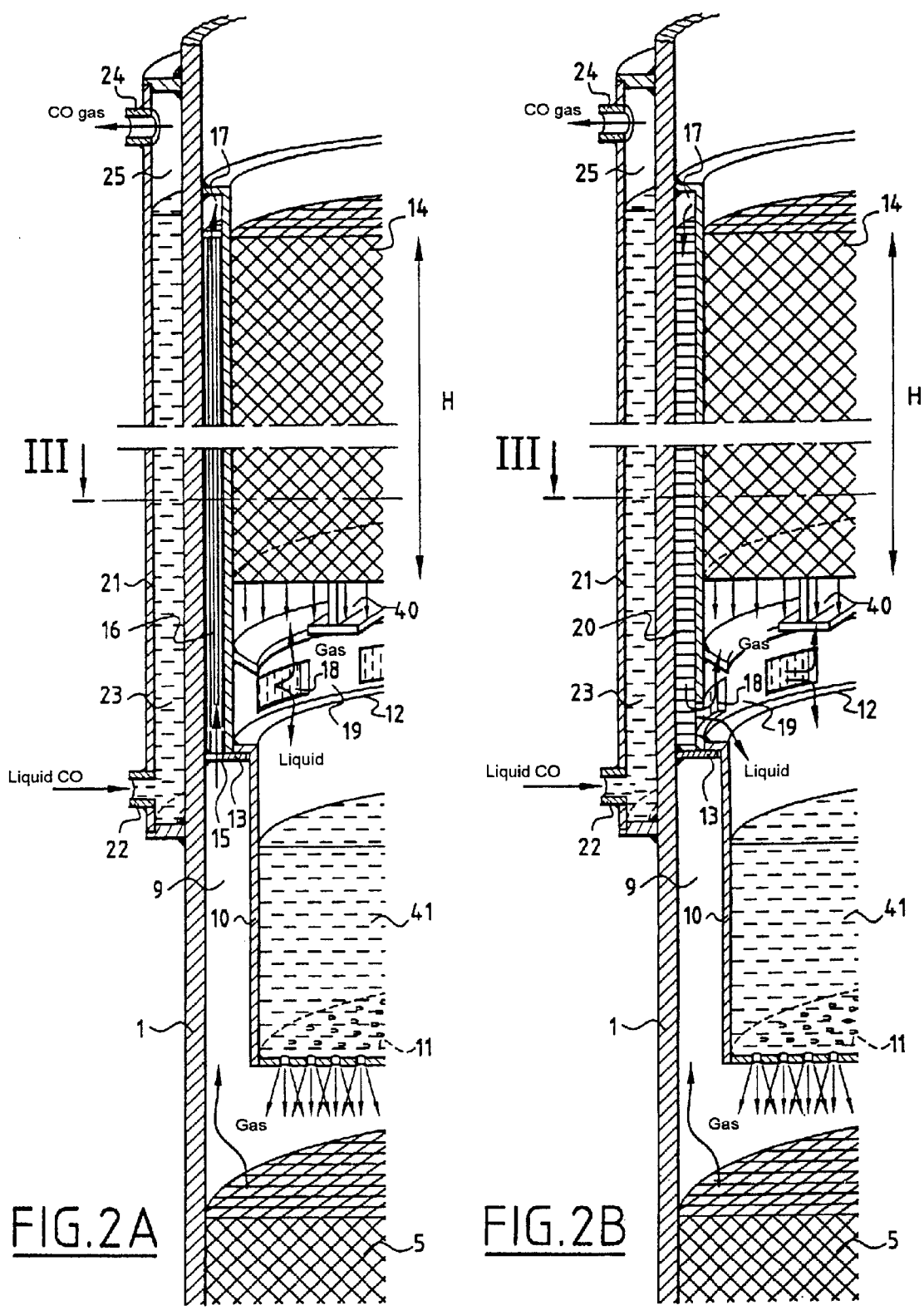
Figure 3:
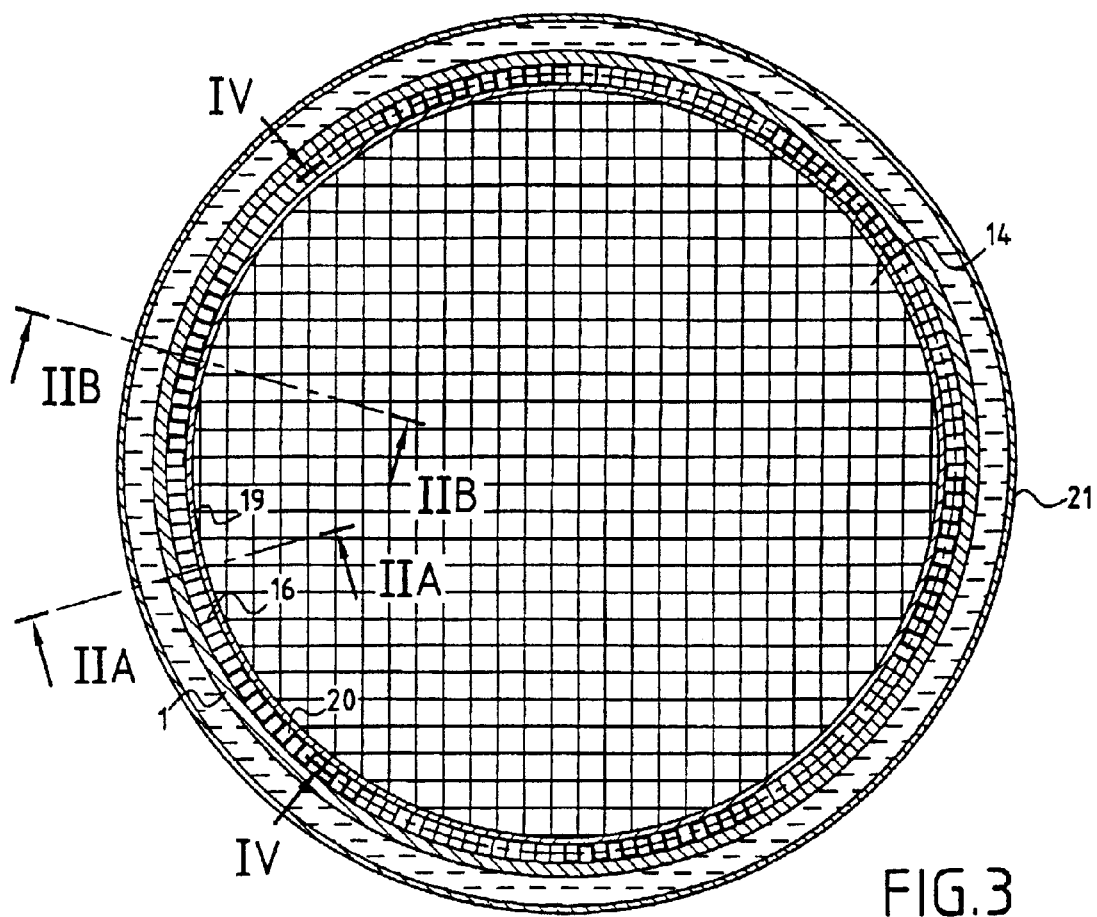
Figure 4:
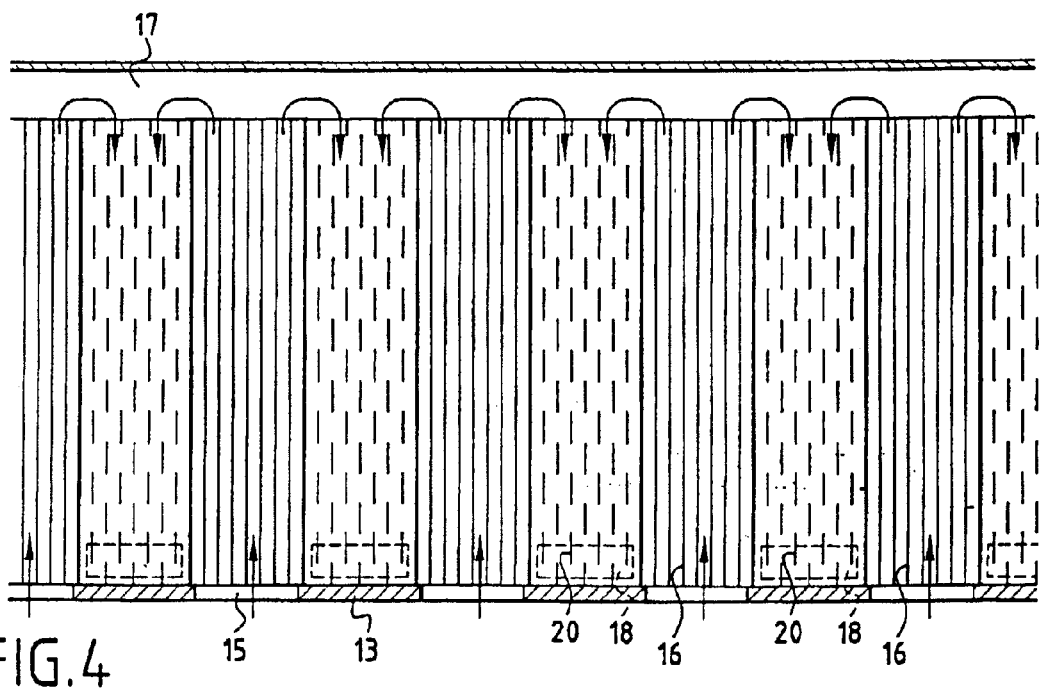

The invention will be better understood from reading the description which follows, given with reference to the following appended figures:

FIG. 1, which shows, in longitudinal section, a column for cryogenic separation according to the invention;

FIGS. 2A and 2B which show, in section and in perspective, two portions of the column according to the invention viewed as enlargements of II of FIG. 1, the two portions being offset angularly according to the planes of section IIA—IIA and IIB—IIB of FIG. 3;

FIG. 3 which shows a cross section on III—III of the column;

FIG. 4 which schematically shows, in a developed front view on IV—IV, a portion of the interior of the internal lining of the column.

The exemplary embodiment of the invention which will now be described in detail relates precisely to the cryogenic separation of hydrogen from a hydrogen/CO/residual methane mixture, with the hydrogen scrubbed with liquid methane, performed in an example of a column according to the invention.

The column for cryogenic separation depicted in FIG. 1 conventionally comprises a cylindrical wall or barrel 1 constituting its main framework. It is made at least partially of a metal which is a good conductor of heat, such as aluminum or one of its alloys (in preference to stainless steel) so as to allow easy heat transfers at least at certain portions of its height, between its internal medium and the external medium under conditions which will be seen later on. The lower part of this column is not appreciably different from known cryogenic separation columns. It comprises means 2 of introducing the hydrogen/CO/methane mixture that is the subject of the cryogenic separation treatment into the column. Typically, this mixture contains 70% hydrogen and 25% CO, with 5% residual methane which does not react during the operation of reforming with steam the methane used as starting compound for the production of the hydrogen/CO mixture. The mixture is introduced at a temperature of −180° C. into the upper part of a separator pot 3. The vapours resulting from this mixture pass through a manifold 4 with a perforated bottom, of conventional design, located underneath a first packing 5. This manifold 4 extends over the entire internal cross section of the column, as does the packing 5. Extraction means 6, 7 are provided for respectively collecting the liquid CO/methane mixtures deposited, on the one hand, in the bottom of the separator pot 3, and also in the bottom 8 of the column in the case of the fraction of CO/methane mixture originating from the manifold 4.

Having passed through the first packing 5, the ascending gaseous mixture enters the column portion designed according to the invention. The gaseous mixture passes into an annular space 9 formed between the wall 1 of the column and a liquid trap 10 consisting of a single cylindrical container with a bottom 11 perforated with holes of small diameter (approximately 4 mm for example). The outside diameter of the liquid trap 10 is smaller than the inside diameter of the column so as to define the annular space 9, the width of which may be a few cm. The upper edge 12 of the liquid trap 10 rests on a support 13 secured to the wall 1 of the column, so as to hold the liquid trap 10 in position inside the column.

At a level appreciably higher up than that of the upper edge 12 of the liquid trap 10, begins a second packing 14 extending over a given height H. The wall of the column has an internal lining, the lower end of which is located at the same level as the upper edge 12 of the liquid trap 10 and the upper end of which is preferably located at the same level as or (as depicted), slightly above, the upper end of the second packing 14. The configuration of this internal lining differs according to the angular sector of the cross section of the column being considered. Two types of configuration are present, these alternating along the internal circumference of the column which is split into an even number of angular sectors, twelve of these in the example depicted (see FIG. 3).

According to a first configuration, demonstrated in FIG. 2a, the internal lining of the column comprises a portion within which the gas, leaving the first packing 5, passes through at least one orifice 15 formed in the lower edge of the internal lining. In the example depicted, this lower edge is coincident with the support 13 on which the liquid trap 10 rests. As a preference, the interior of this portion of the internal lining is lined with heat exchange fins 16. In the preferred example depicted, these heat exchange fins 16 are of the type conventionally known as "straight fins", defining approximately straight "corridors" along which the liquid which condenses inside the lining can descend unimpeded to drop onto the first packing 5. Likewise, the ascending gaseous mixture can progress unimpeded between these heat exchange fins, because it is not hampered by the descending liquid, the latter not being in a turbulent condition because of the configuration of the straight fins.

When the ascending gaseous mixture reaches the upper end 17 of the internal lining, which is not lined with the heat exchange fins, it has the possibility of redescending, passing through a portion of the internal lining adjacent to the previous portion, which is produced according to the second type of configuration shown in FIG. 2B. When the gaseous mixture, which in the meantime has partially condensed, reaches the lower zone of the internal lining, it returns to the internal space of the column, passing through an orifice 18 formed in the wall 19 of the internal lining facing towards the inside of the column. The condensed liquid, rich in CO and in methane, can flow into the liquid trap 10. The hydrogen-enriched gas continues to ascend in the internal space of the column and passes through the second packing 14.

As a preference, as depicted, this portion of the internal lining produced according to the second type of configuration is lined with heat exchange fins 20 of the type known as "serrated fins", which provide a large heat-exchange area and create intense turbulence within the fluid passing through the lining.

Heat exchanges intended to return the temperature of the hydrogen-enriched gaseous mixture to about −180° C. with a view to encouraging the scrubbing of the hydrogen with the liquid methane introduced at the top of the column take place between the mixture present inside the aforementioned lining and a cooling fluid preferably consisting of liquid CO at −182° C. For this purpose, according to the invention, facing the said internal lining, the column has an external jacket 21, defining an annular space with the wall 1 of the column. The external jacket 21 comprises, in its lower part, means 22 of conveying liquid CO 23. In its upper part, it comprises means 24 of extracting the gaseous CO 25 at a pressure of 2.6 bar which forms following the heat exchanges which take place between the fluids present in the jacket and in the lining. During these exchanges, the liquid CO gives up cooling energy to the hydrogen-rich gaseous mixture present in the internal lining, to bring it down to a temperature very close to −180° C., before it passes into the second packing 14.

This operation which, in the prior art, took place in a heat exchanger separate from the column and required the gaseous mixture to be extracted from the column, is here performed actually inside the column. This appreciably reduces the overall bulk of the installation and simplifies its design.

To make the installation more efficient, it is advantageous for the internal lining and external jacket 21 of the column to be located facing the entire height of the second packing 14. In other words, the internal lining and the external jacket 21 have their upper ends located level with or above the upper end of the second packing 14. In this way it is possible to compensate for the reheating of the ascending gases over the entirety of the levels at which it occurs in a favoured way.

As in the prior art, the liquid CO used as cooling fluid is advantageously produced from the CO collected at the top of the low-pressure column where the CO initially present in the synthetic gas, and collected at the bottom of the column of the invention, is separated from the methane it contains. This methane is itself used to scrub the hydrogen in the column of the invention.

In the example depicted in FIG. 1, the column according to the invention comprises two other stages similar to the one which has just been described and which therefore each comprise:

a liquid trap 26, 27;

a packing 28, 29 (or, in general, an active zone);

an internal lining 30, 31;

an external jacket 32, 33;

means 34, 35 for conveying liquid CO into the external jacket 32, 33;

and means 36, 37 of extracting the gaseous CO from the external jacket 32, 33.

It would still be in accordance with the invention if a greater or lesser number of such stages were to be provided. In certain cases, one single stage might be sufficient.

In its upper part, above the last stage at which the cold energy is supplied to the fluid present in the column, there are means 38 known per se to allow the liquid methane to be introduced into the column and to bring it into contact with the gaseous hydrogen in order to purify the latter. Finally, there are means 39 for collecting the gaseous hydrogen at high pressure present at the top of the column in the pure state.

It goes without saying that the column comprises all the other elements necessary or beneficial to its correct operation which it is common practice to install in cryogenic separation columns. In particular, it comprises means 40 for supporting the packings 5, 14, 28, 29 to allow these to be held in position.

The head of liquid 41 present in a liquid trap 10 corresponds to the pressure drop experienced by the ascending gases between the point at which they are withdrawn and the point at which they are reintroduced into the column.

By way of indication, a column such as has just been described, comprising three liquid traps/packing/lining/jacket assemblies, can afford a reduction of about 20% in the height of the active part of the column by comparison with the case of an equivalent column of the conventional type in which the stages of cooling the ascending gases are performed in an external exchanger. If the elimination of the exchanger external to the column and of the pipes connecting it to the column are also taken into consideration, it can be seen that the column according to the invention and its auxiliaries may be appreciably less bulky than the installations of the prior art.

The example which has just been described is one preferred embodiment of the invention, and changes may be made thereto without departing from the spirit of the invention. In particular, the design of the internal lining of the column may be simplified, the essential thing being that heat exchanges by the supply of cold energy to the fluid present in the column should take place through the wall of the column itself, using a fluid filling a jacket formed around the external face of the column.

It goes without saying that the use of the column according to the invention is not restricted to the application which has been described and that such a column can be used for types of cryogenic separation other than the extraction of hydrogen from a hydrogen/CO/methane mixture. Likewise, the use of methane as scrubbing gas in this operation is not exclusive. Propane, in particular, may also be used. Finally, cooling fluids other than the liquid CO can be used to provide the cold energy to the ascending gas. For example, liquid nitrogen may be used.

What is claimed is:

1. Column for the cryogenic separation of gaseous mixtures, characterized in that it comprises:

a cylindrical wall (1);

means (2) of introducing the gaseous mixture into the said column;

at least one assembly consisting of:

two active zones (5, 14, 28, 29) spaced staggered along the height of the column and filling the entire cross section thereof;

a liquid trap (10, 26, 27) located between the said active zones (5, 14, 28, 29), consisting of a cylindrical container with a perforated bottom (11) and the outer side wall of which defines, with the cylindrical wall (1) of the column, an annular space (9) in which the gases circulating upwards inside the column can pass after they have passed through the active zone (5, 14, 28, 29) above which the said liquid trap (10, 26, 27) is positioned;

an internal lining (30, 31) of the cylindrical wall (1) of the column, having its lower end (13) located level with the upper edge of a liquid trap (10, 26, 27), means (15) for causing the gases leaving the active zone (5, 14, 28) located below the said liquid trap (10, 26, 27) to pass into the said internal lining (30, 31), and means (18) for causing the said gases and the condensed liquid they contain to leave the said internal lining (30, 31), returning them to the interior of the column above the said liquid trap (10, 26, 27);

an external jacket (21, 32, 33) of the cylindrical wall (1) of the column, located facing the said internal lining, comprising means (22, 34, 35) of introducing a cooling fluid (23) into its lower part and means (24, 36, 37) of extracting the said fluid at its upper part, the said external jacket (21, 32, 33) allowing heat transfers between the said cooling fluid (23) and the gaseous and liquid matter circulating in the internal lining (30, 31) via the cylindrical wall (1) of the column;

means (38) for introducing a liquefied gas into the upper part of the column to scrub the gas extracted at the top of the column;

means (39) of extracting the most volatile gas from the said gaseous mixture at the top of the said column, and means (6, 7) of extracting, in the liquid state, the least volatile gas or gases of the said gaseous mixture at the bottom of the said column.

2. Column according to claim 1, characterized in that the said internal lining (30, 31) and the said external jacket (21, 32, 33) have their upper ends located at or above the upper end of the active zone (14, 28, 29) hanging over the said liquid trap (10, 26, 27).

3. A column according to claim 1, characterized in that the said internal linings (30, 31) comprise, distributed alternately about the internal circumference of the column, first portions which open at their lower part through orifices (15) into the said annular space (9) and through which the gases circulating upwards inside the column can pass, and second portions opening, in their lower part, through orifices (18) above the upper edge of the said liquid trap (10, 26, 27) so as to convey the circulating gases and the liquid which is condensed in the said second portions into the column, the said first and second portions being placed in communication in the upper end (17) of the said internal lining.

4. Column according to claim 3, characterized in that the said portions of the internal linings are lined with heat exchange fins.

5. Column according to claim 4, characterized in that the said heat exchange fins are of the "straight fin" type (16) in the case of the said first portions, and are of the "serrated fin" type (20) in the case of the said second portions.

6. Column according to claim 1, characterized in that its cylindrical wall (1) is made, at least in its parts lying facing the said external jackets (21, 32, 33), of a material which is a good conductor of heat, particularly aluminium or aluminium alloy.

7. Method for the cryogenic separation of a mixture containing hydrogen and CO, of the type comprising a stage of scrubbing the hydrogen present at the top of the column with a liquefied gas before it is extracted, characterized in that:

it is performed using a column according to one of claim 1 into which the said CO mixture is introduced;

the cooling fluid (23) introduced into the external jackets of the wall of the column is liquid CO; and the liquefied scrubbing gas introduced into the upper part of the column is a hydrocarbon.

8. Method according to claim 7, characterized in that the said liquid CO (23) introduced into the external jackets of the wall of the column consists of CO initially present in the mixture which was introduced into the said column.

9. Method according to claim 7, characterized in that the said scrubbing hydrocarbon introduced into the upper part of the column consists of a hydrocarbon which was initially present as an impurity in the mixture which was introduced into the said column.

10. Method according to claim 7, characterized in that the said liquefied scrubbing hydrocarbon is methane.

* * * * *